United States Patent [19]

Koller

[11] 4,291,485

[45] Sep. 29, 1981

[54] AUTOMATICALLY RELEASING MOUNTING SYSTEM FOR A WEIGHT MEMBER

[76] Inventor: Josef Koller, Au am Aigen 3, D 8077 Reichertshofen, Fed. Rep. of Germany

[21] Appl. No.: 13,612

[22] Filed: Feb. 21, 1979

[30] Foreign Application Priority Data

Jun. 21, 1977 [DE] Fed. Rep. of Germany ... 7719362[U]

[51] Int. Cl.³ .............................................. A01K 91/00
[52] U.S. Cl. .................................................. 43/43.12
[58] Field of Search ...................... 43/41.2, 43.12, 43.1

[56] References Cited

U.S. PATENT DOCUMENTS

| | | | |
|---|---|---|---|
| 2,435,011 | 1/1948 | Mason | 43/41.2 |
| 2,687,592 | 8/1954 | Purcell | 43/43.12 |
| 2,741,059 | 4/1956 | Ostrowski | 43/43.12 |
| 2,914,883 | 1/1959 | Kustusch | 43/43.12 |
| 3,163,957 | 1/1965 | Barrett | 43/41.2 |
| 3,190,028 | 6/1965 | Mambrin | 43/41.2 |
| 3,346,986 | 10/1967 | Tiikainen | 43/43.12 |
| 3,854,235 | 12/1974 | Thompson | 43/43.12 |

*Primary Examiner*—Stephen G. Kunin
*Assistant Examiner*—Robert P. Olszewski
*Attorney, Agent, or Firm*—Fred Philpitt

[57] ABSTRACT

The invention provides for an automatically releasing mounting system by dint of which a weight member may be releasably connected to a fishing-line. The mounting system comprises a receptacle resiliently biassed into essentially conical shape. Wall portions of the receptacle are interconnected by a pivotal joint near the upper end thereof, while latch apparatus are provided to releasably connect the lower ends of the wall portions. The latch apparatus include a latch member having a wing formed integral thereto. When the receptacle hits the surface of the water, the relative movement between the water and the wing portion of the latch member will cause moving of the latch member out of the associated latch-catch. Thus the wall portions of the receptacle cooperating in defining the lower aperture of the container can expand. The receptacle including the latch apparatus can be molded as a single essentially flat part. In order to keep this molded part having been correspondingly bended in the conical or cylindrical configuration the pivotal joint is formed by two members associated to one of the wall portions, respectively, and being adapted for releasable mutual engagement.

9 Claims, 3 Drawing Figures

AUTOMATICALLY RELEASING MOUNTING SYSTEM FOR A WEIGHT MEMBER

BACKGROUND OF THE INVENTION

The invention relates to an automatically releasing mounting system adapted to releasably connect a weight member to the end of a fishing-line. More particularly, the invention relates to a receptacle adapted to receive a weight member to provide for a releasable connection between the weight member and the free end portion of a fishing-line, comprising wall portions cooperating to define a variable outlet opening, comprising pivotal joint means allowing for pivotal relative movement of the wall portions and comprising latch means spaced from the pivot axis defined by the pivotal joint means and adapted to releasably connect the wall portions and to disengage upon hitting the water surface.

A receptacle of the kind referred to above has been disclosed in U.S. Pat. No. 3,190,028.

Such prior art receptacle is adapted to receive a fishing-hook and a bait connected thereto. It is not suited to hold a heavier weight member. Such weight members are used to increase the distance defined between the person holding the fishing-rod and the point where the free end of the fishing-line having the fishing-hook and the float connected thereto hits the surface of the water. Stones are preferably used as weight members, since the weight member is released by the receptacle after hitting the water surface and thus cannot be recovered. The prior art receptacle is disadvantageous in that it will already open when it rests on the ground before it is thrown off. Furthermore, the known receptacle is of comparatively complicated structure and particularly includes a spring. Thus it is furthermore costly to produce and prone to failure.

Furthermore, special mounting systems for use with weight members have become known, wherein the weight member is also automatically detached from associated support means upon hitting the water surface. Such a mounting system has been disclosed in U.S. Pat. No. 2,687,592. This kind of mounting system requires the weight member to be given a particular shape chosen in view of the particular support means used. This is particularly disadvantageous since the weight member cannot be recovered.

SUMMARY OF THE PRESENT INVENTION

In view of the above the main object of the present invention is to provide for a receptacle adapted to receive a weight member for use with a fishing-line, which is of simple structure, which will allow to use weight members of arbitrary shape and which will reliably release the weight member upon hitting the water surface.

To this end the invention provides a receptacle of the kind referred to above, which is characterized in that the wall of the receptacle is formed by a resiliently flexible sheet having free end portions interconnected at the upper ends thereof by the pivotal joint means, in that the latch means associated to the lower ends of the free end portions include a latch-catch formed on one of the free end portions, an opening formed on the other of the free end portions and adapted to receive the latch-catch and a latch member adapted to be inserted into the latch-catch and having a projecting wing portion, and in that the circumferential distance defined by the latch-catch and the opening is smaller than the effective surcumferential extension of the receptacle's transverse cross section taken in a transverse plane including the pivot axis.

Due to the particular arrangement of the pivotal joint means and the latch means the lower portion of the receptacle's wall is bent to a larger degree than the upper wall portion, when the receptacle is in its closed, essentially conical configuration. Thus the lower wall portion of the receptacle experiences an increased resilient biassing force tending to open the aperture defined by the lower edge of the receptacle's wall. When the latch member is moved out of the associated latch-catch upon the wing portion hitting the water surface the aperture defined by the lower wall edge is thus expanded, the receptacle's wall simultaneously assuming an essentially cylindrical configuration. Due to gravity, the weight member will freely move out of the lower aperture of the receptacle in downward direction.

Prefered embodiments of the present invention are shown in the drawings.

With a receptacle in accordance with the invention the fishing-line is allowed to freely slide down along the inclined upper edge of the receptacle's wall.

With a receptacle in accordance with the invention particularly low friction forces opposing the outward movement of the wall portions are obtained.

A receptacle of the present invention can be produced very easily as a single, essentially flat molded member. The pivotal joint means can be easily established by the user by simply inserting the pivot pin into the associated slot. Thus storing and shipping of the receptacle is greatly simplified.

A receptacle in accordance with the invention will allow for very simple adapting of the effective size of the receptacle to weight members of various size. By choosing weight members of different size and thus of different weight various maximum distances of the point of impact of the fishing-hook may be established.

If a receptacle is made in accordance with the invention, essentially the same inclination of the receptacle's wall with respect to the axis of the receptacle is obtained, when the size of the receptacle's cross section is adjusted to weight members of different size.

The improvement of the present invention will allow for particular ease of closing the lower aperture of the receptacle. The feature of is of particular importance, if the wall of the receptacle is made from a low friction plastic material.

A receptacle in accordance with the present invention shows increased mechanical stability in the area being adjacent to the opening provided to fix the receptacle to a float having a through opening receiving the fishing-line for free relative movement. Such increased mechanical stability will allow for easier mounting on the float.

With a receptacle in accordance with the latch member cannot be lost. Also forming of the receptacle as a single piece molded part is simplified.

The further improvement of the present invention is advantageous in view of unobstructed and reliable opening of the lower aperture of the receptacle, when the receptacle hits the water surface.

The further improvement of the present invention will result in an additional increase of the elastic bias encountered in the closed state of the receptacle. This will also assist precise and proper opening of the receptacle when hitting the water surface.

As already pointed out above a single piece molded flat sheet member is particularly advantageous in view of simple and low-cost production as well as in view of simple and low-cost storing and transport thereof.

BRIEF DESCRIPTION OF THE DRAWINGS

These and other features and objects of the present invention will become apparent from the following description and drawings, in which.

Figure 1:
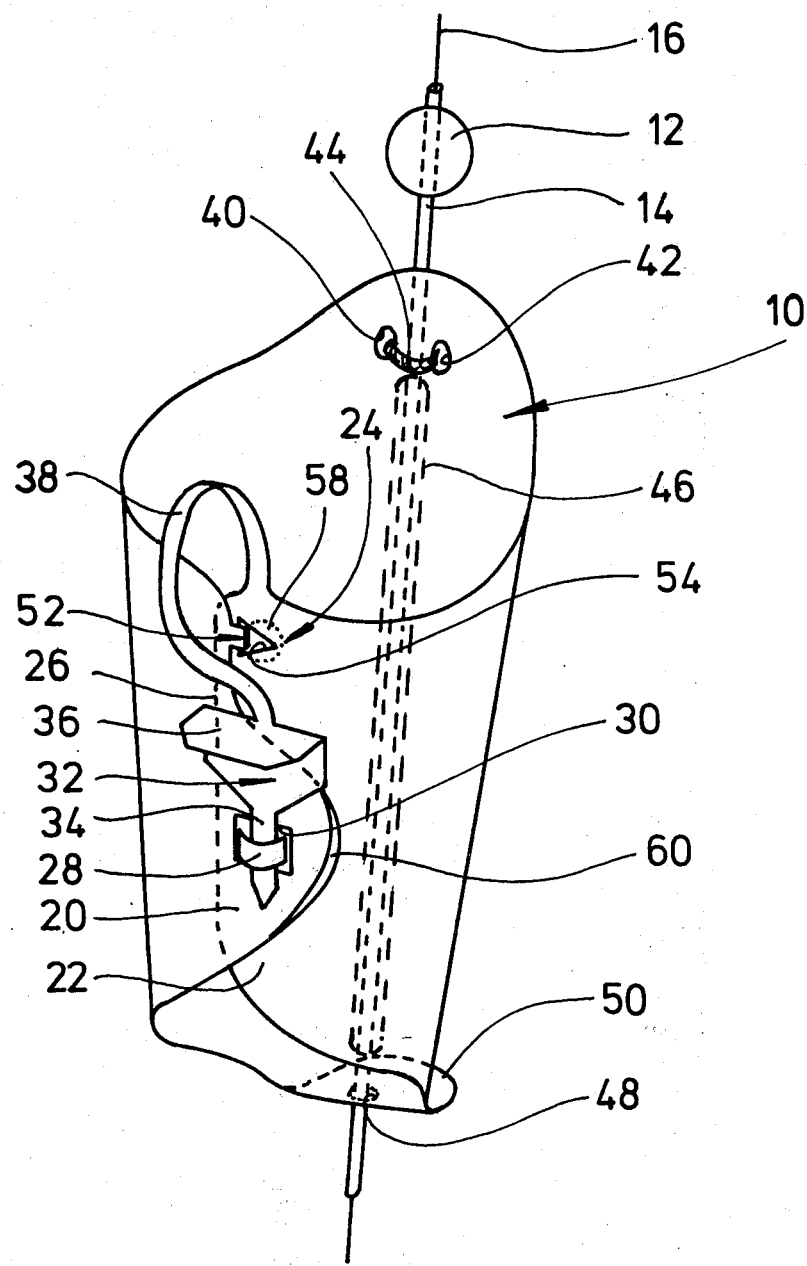
FIG. 1: is a perspective view of a receptacle adapted to receive a weight member shown in connection with a float.

In the drawings a receptacle adapted to receive a weight member (not shown) is generally shown at 10. A float comprising a ball member 12 and a tubular guide member 14 secured thereto receives a fishing-line 16 for free relative movement. The receptacle 10 is fixedly secured to the float as will be described in more detail below.

The receptacle 10 has essentially conical shape. It has been obtained from a flat molded part 18 shown in FIG. 3 by bending thereof. The molded part 18 is made from a low friction plastic material, e.g. polyethylene. Free end portions 20, 22 of the molded part 18 are interconnected by pivotal joint means generally shown at 24, which will be described in more detail below.

The end portion 22 being the interior one in the bent conical configuration of the molded part 18 forming the receptacle 10 comprises a lateral edge 26 extending along a generating line of the cone. In the vicinity of its lower edge the wall portion 22 comprises an essentially half-cylindrical projecting latch-catch 28 formed integral therewith. The end portion 20 comprises an opening 30 being spaced from the pivotal joint means 24 by the same distance as the latch-catch 28. The dimension of the opening 30 is chosen such that the latch-catch 28 may be freely received therein. A latch member 32 comprises a rod shaped portion 34 having round edges and a wing portion 36 extending perpendicular to the axis of the rod shaped portion 34 and being formed integral therewith. The latch member 32 is connected to the end portion 22 by a flexible web portion 38 of small thickness. Thus the latch member 32 cannot be lost and can be moved with respect to the end portion 22 overcoming negligible forces only. The latch-catch 28, the opening 30 and the latch member 32 cooperate to form latch means, which are kept in a frictionally engaging latching position by the increased elastic biasing force encountered in the lower portion of the receptacle.

A portion of the receptacle's wall being diametrically opposed to the pivotal joint means 24 with respect to the axis of the receptacle comprises two openings 40 and 42, through which a mounting cord 44 extends. The latter serves to fixedly secure the upper end of the receptacle 10 to the tubular guide member 14.

The upper edge of the receptacle's wall is inclined in downward direction, the highest portion of the upper edge being adjacent to the openings 40 and 42. Thus the fishing-line 16 may easily move along the upper edge of the container in downward direction. An axial reinforcing rib 46 originates from a point located between the openings 40 and 42 and terminates short above a further opening 48 provided in a tab 50. Tab 50 is formed integral with the wall of the receptacle. The lower end of the tubular guide member 14 extends through the opening 48, which requires that the tab 50 be bent in outward direction. Thus a circumferential depression is obtained in the receptacle's wall, which will provide for increased stiffness of the lower portion of the receptacle's wall with respect to bending.

Figure 2:
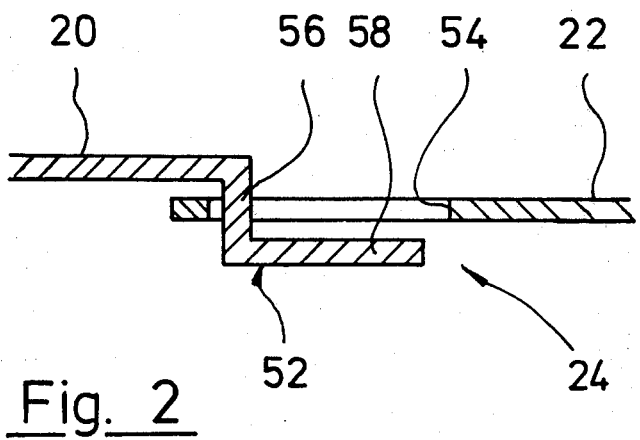
FIG. 2: is a circumferential section through the receptacle shown in FIG. 1 wherein the pivotal joint means is shown in greater detail.

As may be seen from FIG. 1 and especially FIG. 2 the pivotal joint means 24 comprises a pivot pin 52 formed integral with the end portion 20 as well as an essentially triangular slot 54 formed in the end portion 22. The pivot pin 52 has a pivot section 56 essentially extending perpendicular to the wall of the receptacle. The axial dimension of the pivot section 56 is smaller than the thickness of the receptacle's wall, the cross sectional dimensions being smaller than the dimension of the end portion of slot 54 being adjacent to the edge 26. A bearing plate 58 is formed integral with the pivot section 56 and extends parallel to the end portion 20 in the free state thereof. The exterior surface of the bearing plate 58 engages the interior surface of the end portion 22 and is continuously kept in such condition by the spring force produced by the elastic tilting of the pivot section 56, which in turn is due to the circumferential tension produced by bending the formerly flat molded part 18. The axial dimension of the bearing plate 58 as seen in circumferential direction is smaller than the corresponding dimension of slot 54. Thus the bearing plate 58 can be inserted into the slot 54 after having been tilted.

Figure 3:
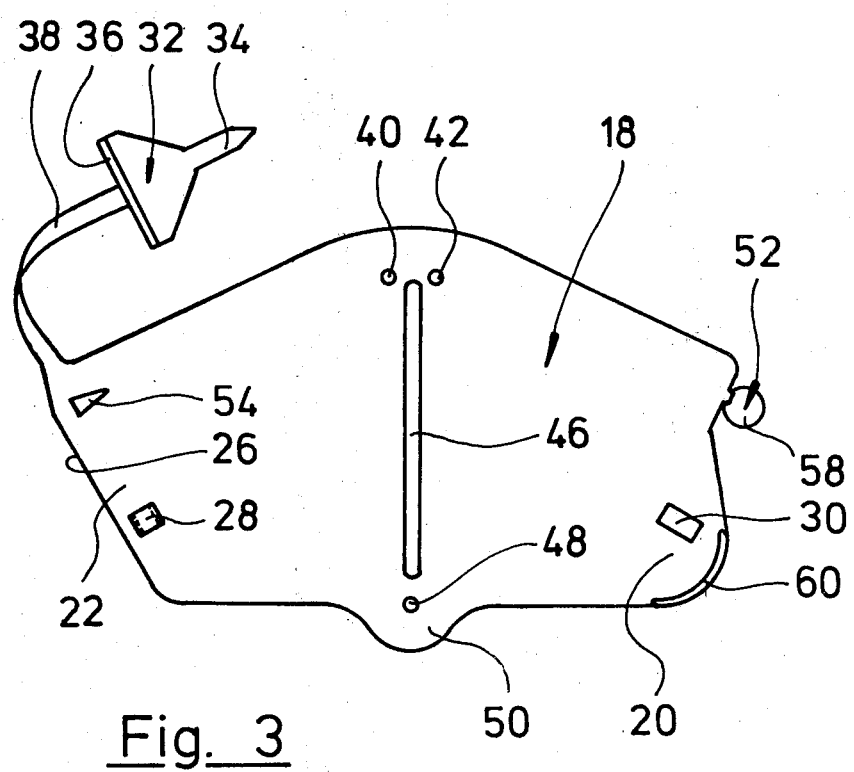
FIG. 3: is an elevational view of an essentially plane resiliently flexible molded part, from which the receptacle may be easily obtained by bending thereof and inserting a pivot pin into an associated slot.

In order to obtain a receptacle 10 as shown in FIG. 1 from the molded part 18 shown in FIG. 3 the molded part 18 is correspondingly bent and the bearing plate 58 is slightly tilted and inserted into the slot 54. After insertion the bearing plate 58 again assumes a position, wherein it extends essentially parallel to the adjacent portion of end portion 20. Thus the pivotal joint means 24 is provided. Thereafter the opening 30 is applied over the latch-catch 28. In order to facilitate such movement the edge portion of the end portion 20 being adjacent to the opening 30 is formed as a rib 60 of increased thickness. This will facilitate gripping of the end portion 20, especially when the hands are wet. Also the end portions 20 and 22 can be easily kept in the just described relative position until the latch member 32 has been inserted into the latch-catch 28. If desired, the interior surface of the end portion 22 may also comprise such rib of increased thickness arranged at the edge portion thereof being adjacent to the latch-catch 28. The latch member 32 is inserted into the latch-catch 28 in such orientation that the wing portion 36 projects from the wall of the receptacle in radial outward direction. Thereafter a stone of appropriate size is introduced into the conical receptacle thus obtained.

The fishing-hook is then thrown off in usual manner and will hit the surface of the water at a larger distance than usual due to the higher weight of the elements carried by the free end of the fishing-line. When the receptacle 10 hits the surface of the water the latch member 32 is retarded by the water displaced by the wing portion 36. Thus the latch member 32 is disengaged from the latch-catch 28 and the opening 30 is moved down from the latch-catch 28, the adjacent portions of end portion 20 partly returning into comparatively flat configuration. Thereafter the end portions 20 and 22 are subject to relative pivotal movement due to the increased resilient biassing force encountered in the lower portion of the receptacle's wall. Thus the wall of the receptacle will assume an essentially cylindrical shape. The stone previously contained within the receptacle 10 will now fall out of the receptacle. Thus the float formed by the ball member 12 and the tubular guide member 14 is suspended in the water quite similarly as in the case of a float which has been thrown off without profiting from the advantages provided by a weight member.

I claim:

1. A receptacle adapted to receive a weight member to provide for a releasable connection between the weight member and the free end portion of a fishing-line, comprising wall portions cooperating to define a variable outlet opening, comprising pivotal joint means allowing for pivotal relative movement of the wall portions and comprising latch means spaced from the pivot axis defined by the pivotal joint means and adapted to releasably connect the wall portions and to disengage upon hitting the water surface, characterized in that the wall of the receptacle is formed by a resiliently flexible sheet, having free end portions interconnected at the upper ends thereof by the pivotal joint means, in that the latch means associated to the lower ends of the free end portions include a latch-catch formed on one of the free end portions, an opening formed on the other of the free end portions and adapted to receive the latch-catch and a latch member adapted to be inserted into the latch-catch and having a projecting wing portion, and in that the circumferential distance defined by the latch-catch and the opening is smaller than the effective circumferential extension of the receptacle's transverse cross section taken in a transverse plane including the pivot axis.

2. The receptacle as in claim 1, characterized in that further upper and lower openings are provided to receive fastening means provided for securing a float, the further upper and lower openings being arranged opposite to the free end portions with respect to the axis of the receptacle, and in that the upper edge of the receptacle extends in downwardly sloped direction from a point adjacent to the upper further openings towards the free end portions.

3. The receptacle as in claim 1, characterized in that the lateral edge of the interior one of the free end portions extends along a generating line of the cone defined by the receptacle's wall.

4. The receptacle as in claim 1, characterized in that the pivotal joint means comprises a joint opening formed in the upper end of one of the free end portions as well as a cranked pivot pin secured to the upper end of the other free end portion, the pivot pin comprising a bearing plate essentially extending parallel to the associated free end portion and being adapted to be inserted through the slot shaped pivot opening if tilted with respect thereto.

5. The receptacle as in claim 1, characterized in that the exterior free end portion comprises a thumb rib arranged in the proximity of the latch means.

6. The receptacle as in claim 1, characterized in that the wall thereof comprises an axial reinforcing rib arranged opposite to the free end portions with respect to the axis of the receptacle.

7. The receptacle as in claim 1, characterized in that the latch member is formed integral with the wall of the receptacle via a web portion being of smaller thickness than the receptacle's wall.

8. The receptacle as in claim 1, characterized in that it comprises a one piece molded part made from low friction plastic material.

9. The receptacle as in claim 1, characterized by a tab formed integral with the lower edge of the receptacle's wall and being made from elastic material, a mounting opening being provided in this tab to receive a tubular guide member, which in turn receives the fishing-line for free axial movement.

* * * * *